US012233629B2

(12) United States Patent
Brunelli et al.

(10) Patent No.: US 12,233,629 B2
(45) Date of Patent: Feb. 25, 2025

(54) FLEXIBLE MULTILAYER FILM

(71) Applicant: Dow Global Technologies LLC, Midland, MI (US)

(72) Inventors: Kleber Brunelli, Jundiai (BR); Nicolas Cardoso Mazzola, Jundiai (BR)

(73) Assignee: Dow Global Technologies LLC, Midland, MI (US)

( * ) Notice: Subject to any disclaimer, the term of this patent is extended or adjusted under 35 U.S.C. 154(b) by 477 days.

(21) Appl. No.: 17/765,069

(22) PCT Filed: Sep. 24, 2020

(86) PCT No.: PCT/US2020/052472
§ 371 (c)(1),
(2) Date: Mar. 30, 2022

(87) PCT Pub. No.: WO2021/067114
PCT Pub. Date: Apr. 8, 2021

(65) Prior Publication Data
US 2022/0347984 A1 Nov. 3, 2022

Related U.S. Application Data

(60) Provisional application No. 62/907,853, filed on Sep. 30, 2019.

(51) Int. Cl.
| | |
|---|---|
| *B32B 27/08* | (2006.01) |
| *B32B 1/00* | (2024.01) |
| *B32B 7/12* | (2006.01) |
| *B32B 27/30* | (2006.01) |
| *B32B 27/32* | (2006.01) |
| *B32B 27/34* | (2006.01) |
| *B32B 27/36* | (2006.01) |
| *B65D 65/40* | (2006.01) |
| *B65D 81/34* | (2006.01) |

(52) U.S. Cl.
CPC ............... *B32B 27/08* (2013.01); *B32B 1/00* (2013.01); *B32B 7/12* (2013.01); *B32B 27/306* (2013.01); *B32B 27/308* (2013.01); *B32B 27/32* (2013.01); *B32B 27/34* (2013.01); *B32B 27/36* (2013.01); *B65D 65/40* (2013.01); *B65D 81/3415* (2013.01); *B32B 2250/05* (2013.01); *B32B 2250/24* (2013.01); *B32B 2270/00* (2013.01); *B32B 2307/31* (2013.01); *B32B 2307/732* (2013.01); *B32B 2439/46* (2013.01); *B32B 2439/70* (2013.01)

(58) Field of Classification Search
CPC .. B32B 27/08; B32B 1/00; B32B 7/12; B32B 27/306; B32B 27/308; B32B 27/32; B32B 27/34; B32B 27/36; B32B 2250/05; B32B 2250/24; B32B 2270/00; B32B 2307/31; B32B 2307/732; B32B 2439/46; B32B 2439/70; B65D 65/40; B65D 81/3415
See application file for complete search history.

(56) References Cited

U.S. PATENT DOCUMENTS

| | | | |
|---|---|---|---|
| 6,231,975 B1 | 5/2001 | Kong et al. | |
| 6,541,426 B1 * | 4/2003 | Kostansek | ............ A01N 25/04 514/937 |
| 7,608,668 B2 | 10/2009 | Li Pi Shan et al. | |
| 7,858,706 B2 | 12/2010 | Arriola et al. | |
| 7,893,166 B2 | 2/2011 | Shan et al. | |
| 7,947,793 B2 | 5/2011 | Marchand et al. | |
| 8,668,969 B2 | 3/2014 | Pockat et al. | |
| 8,709,595 B2 | 4/2014 | Siegel et al. | |
| 8,945,708 B1 | 2/2015 | Vogel et al. | |
| 9,327,867 B2 | 5/2016 | Stanley et al. | |
| 9,469,088 B2 | 10/2016 | Stanley et al. | |
| 9,688,459 B2 | 6/2017 | Stanley et al. | |
| 9,802,719 B2 | 10/2017 | Stanley et al. | |
| 10,138,362 B2 | 11/2018 | Wang et al. | |
| 10,486,402 B2 | 11/2019 | Hu et al. | |
| 2004/0048086 A1 | 3/2004 | Kennedy et al. | |
| 2004/0166262 A1 | 8/2004 | Busche et al. | |
| 2004/0241479 A1 | 12/2004 | Domine et al. | |
| 2005/0238874 A1 | 10/2005 | Pellingra et al. | |
| 2006/0013929 A1 | 1/2006 | Morris et al. | |
| 2006/0210744 A1 | 9/2006 | Bekele | |
| 2007/0014947 A1 | 1/2007 | Mengel et al. | |
| 2007/0014953 A1 | 1/2007 | Siegel et al. | |
| 2007/0026250 A1 | 2/2007 | Hofmeister et al. | |
| 2007/0031690 A1 | 2/2007 | Busche et al. | |
| 2007/0031691 A1 | 2/2007 | Forloni et al. | |
| 2007/0044906 A1 | 3/2007 | Park | |
| 2007/0045967 A1 | 3/2007 | Park | |
| 2007/0048476 A1 | 3/2007 | Park | |
| 2007/0054139 A1 | 3/2007 | Domine | |
| 2007/0104901 A1 | 5/2007 | Siegel et al. | |
| 2007/0243276 A1 | 10/2007 | Carneiro et al. | |

(Continued)

FOREIGN PATENT DOCUMENTS

| | | |
|---|---|---|
| CN | 106457759 A | 2/2017 |
| CN | 108367551 A | 8/2018 |

(Continued)

*Primary Examiner* — Michael C Miggins
(74) *Attorney, Agent, or Firm* — Boyle Fredrickson, S.C.

(57) ABSTRACT

The present disclosure provides a flexible multilayer film. The flexible multilayer film includes at least three layers. One of the layers is a seal layer and one of the layers is a barrier layer. The seal layer is an ionomer. The backing layer is in direct contact with the seal layer. The backing layer is an ethylene/α-olefin multi-block copolymer.

15 Claims, No Drawings

(56) References Cited

U.S. PATENT DOCUMENTS

| | | | |
|---|---|---|---|
| 2008/0031555 | A1 | 2/2008 | Roberts |
| 2008/0095960 | A1 | 4/2008 | Schell et al. |
| 2008/0138478 | A1 | 6/2008 | Ebner et al. |
| 2013/0052470 | A1 | 2/2013 | Botros |
| 2014/0295076 | A1 | 10/2014 | Siu et al. |
| 2014/0363544 | A1 | 12/2014 | Putsch et al. |
| 2015/0104628 | A1 | 4/2015 | O'Donnell et al. |
| 2015/0217543 | A1 | 8/2015 | Kupsch et al. |
| 2015/0336363 | A1 | 11/2015 | Barbaroux et al. |
| 2015/0360450 | A1 | 12/2015 | Barbaroux et al. |
| 2016/0152390 | A1 | 6/2016 | Itoh et al. |
| 2016/0185085 | A1 | 6/2016 | Spigaroli et al. |
| 2016/0236862 | A1 | 8/2016 | Gkinosatis |
| 2017/0088318 | A1 | 3/2017 | Franca et al. |
| 2018/0264787 | A1 | 9/2018 | Hausmann et al. |
| 2018/0362232 | A1 | 12/2018 | Spigaroli et al. |
| 2021/0331845 | A1 | 10/2021 | Laddha et al. |

FOREIGN PATENT DOCUMENTS

| | | | |
|---|---|---|---|
| CN | 108025849 | A | 5/2020 |
| EP | 2862712 | A1 | 4/2015 |
| JP | S57-125045 | A | 8/1982 |
| JP | 2002-347850 | A | 12/2002 |
| JP | 2003-311896 | A | 11/2003 |
| JP | 2009-298119 | A | 12/2009 |
| WO | 2012/076481 | A1 | 6/2012 |
| WO | 2017/075022 | A1 | 5/2017 |
| WO | 2017/093541 | A1 | 6/2017 |

\* cited by examiner

FLEXIBLE MULTILAYER FILM

BACKGROUND

The "cook-in" process refers to the process of cooking a product packaged in a material capable of withstanding exposure to long and slow cooking conditions (2 to 12 hours, for example) while containing the food product, in water at elevated temperature (50° C. to 100° C., for example). Cook-in packaged foods are essentially pre-packaged, pre-cooked food which may be directly transferred to the consumer in this form. The cook-in process requires food packaging with strong seals that will support the food product and avoid leakage.

The cook-in process also requires that the packaging withstand high levels of heat for a short period (i.e. microwave cooking) or low heat for an extended period (i.e. oven baking). The seal layers must have adequate seal strength to keep the seals closed, or otherwise sealed, over a range of sealing conditions. Typically, this has been achieved by using a thick backing layer, composed of a blend of multiple components, adhered to a thick ionomer seal layer. However, cook-in films with thick backing layers are disadvantageous because a thicker backing layer will require more force to open the packaging, increasing the risk of damage to the product inside the package.

When the cook-in product is meat, a thick ionomer seal layer disadvantageously exhibits protein adhesion which can diminish shelf appeal and shelf life.

Since ionomers are expensive, it would be desirable to produce a seal layer using less ionomer without sacrificing the seal strength of the cook-in pouch. The art recognizes the need for a cook-in product package having a lower film thickness which can still maintain adequate seal strength for the cook-in process.

SUMMARY

The present disclosure provides a flexible multilayer film. In an embodiment, the flexible multilayer film includes at least three layers. One of the layers is a seal layer, and one of the layers is a barrier layer. The seal layer is composed of an ionomer. The backing layer is in direct contact with the seal layer and is composed of an ethylene/α-olefin multi-block copolymer.

The present disclosure also provides a flexible pouch. In an embodiment, the flexible pouch includes opposing flexible multilayer films that define a common edge. Each multilayer film includes at least three layers. One of the layers is a seal layer, and one of the layers is a barrier layer. The seal layer is composed of an ionomer. The backing layer is in direct contact with the seal layer and composed of an ethylene/α-olefin multi-block copolymer. A peripheral seal extends along at least a portion of the common peripheral edge. The peripheral seal forms a closed flexible pouch having a storage compartment.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1 or 2, or 3 to 5, or 6, or 7), any subrange between any two explicit values is included (e.g., the range 1-7 above includes 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "barrier", and the phrase "barrier layer", as applied to films and/or film layers, are used with reference to the ability of a film or film layer to serve as a barrier to one or more gases and/or moisture.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers are characterized by unique distributions of both polymer polydispersity (PDI or Mw/Mn) and block length distribution, due to the effect of shuttling agent(s) in combination with the catalyst(s) employed in their preparation.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The term "cook-in," as used herein, refers to the process of cooking a product, for example a comestible, packaged in a flexible polymeric film material capable of withstanding exposure to long and slow cooking conditions (2-12 hours) in warm/hot water (50° C.-100° C.) while containing the food product in the package without leakage. Cook-in packaged foods are sealed pouches made from flexible polymeric film. Cook-in sealed pouches maintain seal integrity, over a broad temperature range, from −10° C. (freezer storage) to 100° C. (boiling water cooking).

The term "directly contacts," or "in direct contact with," or similar terms as used herein, refers to a film layer configuration whereby a first film layer is located immediately adjacent to a second film layer, the first film layer touches the second film layer, and no intervening layers, and/or no intervening structures, are present between the first film layer and the second film layer. The term "indirectly contacts," or "in indirect contact with," or similar terms as used herein, refers to a film layer configuration whereby an intervening layer, or an intervening structure, is present between the first film layer and the second film layer.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low-density polyethylene (LDPE) and linear polyethylene. Nonlimiting examples of linear polyethylene include linear low density polyethylene (LLDPE), ultra-low density polyethylene (ULDPE), very low density polyethylene (VLDPE), multicomponent ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low-density polyethylene resins (available from The Dow Chemical Company), DOWLEX™ polyethylene resins (available from the Dow Chemical Company), and MARLEX™ polyethylene (available from Chevron Phillips).

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high-pressure free radical polymerization (tubular reactor or autoclave with free radical initiator). Nonlimiting examples of LDPE include Marlex™ (Chevron Phillips), LUPOLEN™ (LyondellBasell), as well as LDPE products from Borealis, Ineos, ExxonMobil, and others.

An "olefin-based polymer" or "polyolefin" is a polymer that contains more than 50 weight percent polymerized olefin monomer (based on total amount of polymerizable monomers), and optionally, may contain at least one comonomer. A nonlimiting examples of an olefin-based polymer is ethylene-based polymer.

The term "outer layer," as used herein, is a layer of a multilayer packaging film and is the film layer furthest from the product in the packaging, relative to the other layers of the multilayer film. Likewise, the "outside surface" of a packaging article (i.e., bag) is the surface away from the product being packaged within the article.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably.

The term "tie layer," as used herein, is a film layer that serves to adhere two film layers to one another, which layers would otherwise not adhere to one another, or would not adhere to one another with sufficient bond strength.

Test Methods $^1$H NMR Method

A stock solution (3.26 g) was added to "0.133 g of the polymer sample" in 10 mm NMR tube. The stock solution was a mixture of tetrachloroethane-$d_2$ (TCE) and perchloroethylene (50:50, w:w) with 0.001M $Cr^{3+}$. The solution in the tube was purged with $N_2$, for 5 minutes, to reduce the amount of oxygen. The capped sample tube was left at room temperature, overnight, to swell the polymer sample. The sample was dissolved at 110° C. with periodic vortex mixing. The samples were free of the additives that may contribute to unsaturation, for example, slip agents such as erucamide. Each $^1$H NMR analysis was run with a 10 mm cryoprobe, at 120° C., on Bruker AVANCE 400 MHz spectrometer.

Two experiments were run to get the unsaturation: the control and the double presaturation experiments. For the control experiment, the data was processed with an exponential window function with LB=1 Hz, and the baseline was corrected from 7 to −2 ppm. The signal from residual $^1$H of TCE was set to 100, and the integral $I_{total}$ from −0.5 to 3 ppm was used as the signal from whole polymer in the control experiment. The "number of $CH_2$ group, $NCH_2$," in the polymer was calculated as follows in Equation 1A:

$$NCH_2 = I_{total}/2 \quad \text{(Eqn. 1A)}.$$

For the double presaturation experiment, the data was processed with an exponential window function with LB=1 Hz, and the baseline was corrected from about 6.6 to 4.5 ppm. The signal from residual $^1$H of TCE was set to 100, and the corresponding integrals for unsaturations ($I_{vinylene}$, $I_{trisubstituted}$, and $I_{vinylidene}$) were integrated. It is well known to use NMR spectroscopic methods for determining polyethylene unsaturation, for example, see Busico, V., et al., *Macromolecules*, 2005, 38, 6988. The number of unsaturation units for vinylene, trisubstituted, vinyl and vinylidene were calculated as follows:

$$N_{vinylene} = I_{vinylene}/2 \quad \text{(Eqn. 2A)},$$

$$N_{trisubstituted} = I_{trisubstitute} \quad \text{(Eqn. 3A)},$$

$$N_{vinyl} = I_{vinyl}/2 \quad \text{(Eqn. 4A)},$$

$$N_{vinylidene} = I_{vinylidene}/2 \quad \text{(Eqn. 5A)}.$$

The unsaturation units per 1,000 carbons, all polymer carbons including backbone carbons and branch carbons, were calculated as follows:

$$N_{vinylene}/1{,}000 \text{ C} = (N_{vinylene}/NCH_2)*1{,}000 \quad \text{(Eqn. 6A)},$$

$$N_{trisubstituted}/1{,}000 \text{ C} = (N_{trisubstituted}/NCH_2)*1{,}000 \quad \text{(Eqn. 7A)},$$

$$N_{vinyl}/1{,}000 \text{ C} = (N_{vinyl}/NCH_2)*1{,}000 \quad \text{(Eqn. 8A)},$$

$$N_{vinylidene}/1{,}000 \text{ C} = (N_{vinylidene}/NCH_2)*1{,}000 \quad \text{(Eqn. 9A)},$$

The chemical shift reference was set at 6.0 ppm for the $^1$H signal from residual proton from TCE-d2. The control was run with ZG pulse, NS=4, DS=12, SWH=10,000 Hz, AQ=1.64 s, D1=14 s. The double presaturation experiment was run with a modified pulse sequence, with O1P=1.354 ppm, O2P=0.960 ppm, PL9=57 db, PL21=70 db, NS=100, DS=4, SWH=10,000 Hz, AQ=1.64 s, D1=1 s (where D1 is the presaturation time), D13=13 s. Only the vinyl levels were reported in Table 2 below.

$^{13}$C NMR Method

Samples are prepared by adding approximately 3 g of a 50/50 mixture of tetra-chloroethane-d2/orthodichlorobenzene, containing 0.025 M Cr(AcAc)$_3$, to a "0.25 g polymer sample" in a 10 mm NMR tube. Oxygen is removed from the sample by purging the tube headspace with nitrogen. The samples are then dissolved, and homogenized, by heating the tube and its contents to 150° C., using a heating block and heat gun. Each dissolved sample is visually inspected to ensure homogeneity.

All data are collected using a Bruker 400 MHz spectrometer. The data is acquired using a 6 second pulse repetition delay, 90-degree flip angles, and inverse gated decoupling with a sample temperature of 120° C. All measurements are made on non-spinning samples in locked mode. Samples are allowed to thermally equilibrate for 7 minutes prior to data acquisition. The $^{13}$C NMR chemical shifts were internally referenced to the EEE triad at 30.0 ppm.

C13 NMR Comonomer Content: It is well known to use NMR spectroscopic methods for determining polymer composition. ASTM D 5017-96; J. C. Randall et al., in "NMR and Macromolecules" ACS Symposium series 247; J. C. Randall, Ed., Am. Chem. Soc., Washington, D.C., 1984, Ch. 9; and J. C. Randall in "Polymer Sequence Determination", Academic Press, New York (1977) provide general methods of polymer analysis by NMR spectroscopy.

Conventional Gel Permeation Chromatography (Conv. GPC)

A GPC-IR high temperature chromatographic system from PolymerChar (Valencia, Spain), was equipped with a Precision Detectors (Amherst, MA), 2-angle laser light scattering detector Model 2040, an IR5 infrared detector and a 4-capillary viscometer, both from PolymerChar. Data collection was performed using PolymerChar Instrument Control software and data collection interface. The system was equipped with an online, solvent degas device and pumping system from Agilent Technologies (Santa Clara, CA).

Injection temperature was controlled at 150 degrees C. The columns used, were three, 10-micron "Mixed-B" columns from Polymer Laboratories (Shropshire, UK). The solvent used was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently at 160 degrees C. for three hours. The injection volume was "200 microliters," and the flow rate was "1 milliliters/minute." The GPC column set was calibrated by running 21 "narrow molecular weight distribution" polystyrene standards. The molecular weight (MW) of the standards ranges from 580 to 8,400,000 g/mole, and the standards were contained in six "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards were dissolved at 80° C., with gentle agitation, for 30 minutes. The narrow standards mixtures were run first, and in order of decreasing "highest molecular weight component," to minimize degradation. The polystyrene standard peak molecular weights were converted to polyethylene molecular weight using Equation 1 (as described in Williams and Ward, *J. Polym. Sci.*, Polym. Letters, 6, 621 (1968)):

$$M\text{polyethylene} = A \times (M\text{polystyrene})^B \quad \text{(Eqn. 1)},$$

where M is the molecular weight, A is equal to 0.4316 and B is equal to 1.0.

Number-average molecular weight (Mn(conv gpc)), weight average molecular weight (Mw-conv gpc), and z-average molecular weight (Mz(conv gpc)) were calculated according to Equations 2-4 below.

$$Mn(convgpc) = \frac{\sum_{i=RV_{integrationstart}}^{i=RV_{integrationend}} (IR_{measurementchannel_i})}{\sum_{i=RV_{integrationstart}}^{i=RV_{integrationend}} (IR_{measurementchannel_i}/M_{PE_i})} \quad \text{(Eqn. 2)}$$

$$Mw(convgpc) = \frac{\sum_{i=RV_{integrationstart}}^{i=RV_{integrationend}} (M_{PE_i} IR_{measurementchannel_i})}{\sum_{i=RV_{integrationstart}}^{i=RV_{integrationend}} (IR_{measurementchannel_i})} \quad \text{(Eqn. 3)}$$

$$Mz(convgpc) = \frac{\sum_{i=RV_{integrationstart}}^{i=RV_{integrationend}} (M_{PE_i}^2 IR_{measurementchannel_i})}{\sum_{i=RV_{integrationstart}}^{i=RV_{integrationend}} (M_{PE_i} IR_{measurementchannel_i})} \quad \text{(Eqn. 4)}$$

In Equations 2-4, the RV is column retention volume (linearly-spaced), collected at "1 point per second," the IR is the baseline-subtracted IR detector signal, in Volts, from the IR5 measurement channel of the GPC instrument, and $M_{PE}$ is the polyethylene-equivalent MW determined from Equation 1. Data calculation were performed using "GPC One software (version 2.013H)" from PolymerChar.

Creep Zero Shear Viscosity Measurement Method

Zero-shear viscosities were obtained via creep tests, which were conducted on an AR-G2 stress controlled rheometer (TA Instruments; New Castle, Del), using "25-mm-diameter" parallel plates, at 190° C. The rheometer oven was set to test temperature for at least 30 minutes, prior to zeroing the fixtures. At the testing temperature, a compression molded sample disk was inserted between the plates, and allowed to come to equilibrium for five minutes. The upper plate was then lowered down to 50 µm (instrument setting) above the desired testing gap (1.5 mm). Any superfluous material was trimmed off, and the upper plate was lowered to the desired gap. Measurements were done under nitrogen purging, at a flow rate of 5 L/min. The default creep time was set for two hours. Each sample was compression—molded into a "2 mm thick×25 mm diameter" circular plaque, at 177° C., for five minutes, under 10 MPa pressure, in air. The sample was then taken out of the press and placed on a counter top to cool.

A constant low shear stress of 20 Pa was applied for all of the samples, to ensure that the steady state shear rate was low enough to be in the Newtonian region. The resulting steady state shear rates were in the range from $10^{-3}$ to $10^{-4}$ s$^{-1}$ for the samples in this study. Steady state was determined by taking a linear regression for all the data, in the last 10% time window of the plot of "log (J(t)) vs. log(t)," where J(t) was creep compliance and t was creep time. If the slope of the linear regression was greater than 0.97, steady state was considered to be reached, then the creep test was stopped. In all cases in this study, the slope meets the criterion within one hour. The steady state shear rate was determined from the slope of the linear regression of all of the data points, in the last 10% time window of the plot of "ε vs. t," where ε was strain. The zero-shear viscosity was determined from the ratio of the applied stress to the steady state shear rate.

In order to determine if the sample was degraded during the creep test, a small amplitude oscillatory shear test was conducted before, and after, the creep test, on the same specimen from 0.1 to 100 rad/s. The complex viscosity values of the two tests were compared. If the difference of the viscosity values, at 0.1 rad/s, was greater than 5%, the sample was considered to have degraded during the creep test, and the result was discarded.

Density is measured in accordance with ASTM D792, Method B. The result is recorded in grams per cubic centimeter (g/cc).

Differential Scanning Calorimetry (DSC)

Differential Scanning calorimetry (DSC) can be used to measure the melting, crystallization, and glass transition behavior of a polymer over a wide range of temperature. For example, the TA Instruments C11000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to –40° C. at a 10° C./minute cooling rate and held isothermal at –40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to –20° C. The heat curve is analyzed by setting baseline endpoints from –20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=(($H_f$)/292 J/g)×100

The heat of fusion ($H_f$) (also known as melt enthalpy) and the peak melting temperature are reported from the second heat curve. Peak crystallization temperature is determined from the cooling curve.

Melt index (MI) (I2) is measured in accordance with ASTM D1238 (190° C./2.16 kg). The result is reported in grams eluted per 10 minutes (g/10 min). Melt index (I10) is measured in accordance with ASTM D1238 (190° C./10 kg), with results reported in g/10 min. Melt index ratio (I10/I2) is measured in accordance with ASTM D1238 at a temperature of 190° C. taking the ratio of values obtained at 10 kg and 2.16 kg.

Molecular Weighted Comonomer Distribution Index (MWCDI)

A GPC-IR, high temperature chromatographic system from PolymerChar (Valencia, Spain) was equipped with a Precision Detectors' (Amherst, MA) 2-angle laser light scattering detector Model 2040, and an IR5 infrared detector (GPC-IR) and a 4-capillary viscometer, both from Polymer-Char. The "15-degree angle" of the light scattering detector was used for calculation purposes. Data collection was performed using PolymerChar Instrument Control software and data collection interface. The system was equipped with an online, solvent degas device and pumping system from Agilent Technologies (Santa Clara, CA).

Injection temperature was controlled at 150 degrees Celsius. The columns used, were four, 20-micron "Mixed-A" light scattering columns from Polymer Laboratories (Shropshire, UK). The solvent was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently, at 160 degrees C., for three hours. The injection volume was "200 microliters," and the flow rate was "1 milliliters/minute."

Calibration of the GPC column set was performed with 21 "narrow molecular weight distribution" polystyrene standards, with molecular weights ranging from 580 to 8,400,000 g/mole. These standards were arranged in six "cocktail" mixtures, with at least a decade of separation between individual molecular weights. The standards were purchased from Polymer Laboratories (Shropshire UK). The polystyrene standards were prepared at "0.025 grams in 50 milliliters of solvent" for molecular weights equal to, or greater than, 1,000,000 g/mole, and at "0.050 grams in 50 milliliters of solvent" for molecular weights less than 1,000,000 g/mole. The polystyrene standards were dissolved at 80 degrees Celsius, with gentle agitation, for 30 minutes. The narrow standards mixtures were run first, and in order of decreasing "highest molecular weight component," to minimize degradation. The polystyrene standard peak molecular weights were converted to polyethylene molecular weights using Equation 1B (as described in Williams and Ward, J. Polym. Sci., Polym. Let., 6, 621 (1968)):

$$M\text{polyethylene} = A \times (M\text{polystyrene})^B \quad \text{(Eqn. 1B)},$$

where M is the molecular weight, A has a value of approximately 0.40 and B is equal to 1.0. The A value was adjusted between 0.385 and 0.425 (depending upon specific column-set efficiency), such that NBS 1475A (NIST) linear polyethylene weight-average molecular weight corresponded to 52,000 g/mole, as calculated by Equation 3B, below:

$$Mn(LALSgpc) = \frac{\sum_{i=RV_{integrationstart}}^{i=RV_{integrationend}} (IR_{measurementchannel_i})}{\sum_{i=RV_{integrationstart}}^{i=RV_{integrationend}} (IR_{measurementchannel_i}/M_{PE_i})} \quad \text{(Eqn. 2B)}$$

$$Mw(LALSgpc) = \frac{\sum_{i=RV_{integrationstart}}^{i=RV_{integrationend}} (M_{PE_i} IR_{measurementchannel_i})}{\sum_{i=RV_{integrationstart}}^{i=RV_{integrationend}} (IR_{measurementchannel_i})} \quad \text{(Eqn. 3B)}$$

In Equations 2B and 3B, RV is column retention volume (linearly-spaced), collected at "1 point per second." The IR is the baseline-subtracted IR detector signal, in Volts, from the measurement channel of the GPC instrument, and the $M_{PE}$ is the polyethylene-equivalent MW determined from Equation 1B. Data calculation were performed using "GPC One software (version 2.013H)" from PolymerChar.

A calibration for the IR5 detector ratios was performed using at least ten ethylene-based polymer standards (polyethylene homopolymer and ethylene/octene copolymers; narrow molecular weight distribution and homogeneous comonomer distribution) of known short chain branching (SCB) frequency (measured by the $^{13}$C NMR Method, as discussed above), ranging from homopolymer (0 SCB/1000 total C) to approximately 50 SCB/1000 total C, where total C=carbons in backbone+carbons in branches. Each standard had a weight-average molecular weight from 36,000 g/mole to 126,000 g/mole, as determined by the GPC-LALS processing method described above. Each standard had a molecular weight distribution (Mw/Mn) from 2.0 to 2.5, as determined by the GPC-LALS processing method described above. Polymer properties for the SCB standards are shown in Table 1.

TABLE 1

"SCB" Standards

| Wt % Comonomer | IR5 Area ratio | SCB/1000 Total C | Mw | Mw/Mn |
|---|---|---|---|---|
| 23.1 | 0.2411 | 28.9 | 37,300 | 2.22 |
| 14.0 | 0.2152 | 17.5 | 36,000 | 2.19 |
| 0.0 | 0.1809 | 0.0 | 38,400 | 2.20 |
| 35.9 | 0.2708 | 44.9 | 42,200 | 2.18 |
| 5.4 | 0.1959 | 6.8 | 37,400 | 2.16 |
| 8.6 | 0.2043 | 10.8 | 36,800 | 2.20 |
| 39.2 | 0.2770 | 49.0 | 125,600 | 2.22 |
| 1.1 | 0.1810 | 1.4 | 107,000 | 2.09 |
| 14.3 | 0.2161 | 17.9 | 103,600 | 2.20 |
| 9.4 | 0.2031 | 11.8 | 103,200 | 2.26 |

The "IR5 Area Ratio" (or "IR5$_{Methyl\ Channel\ Area}$/IR5$_{Measurement\ Channel\ Area}$") of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "SCB" standards. A linear fit of the SCB frequency versus the "IR5 Area Ratio" was constructed in the form of the following Equation 4B:

SCB/1000 total C=$A_0$+[$A_1$×(IR5$_{Methyl\ Channel\ Area}$/IR5$_{Measurement\ Channel\ Area}$)](Eqn. 4B), where $A_0$ is the "SCB/1000 total C" intercept at an "IR5 Area Ratio" of zero, and $A_1$ is the slope of the "SCB/1000 total C" versus "IR5 Area Ratio," and represents the increase in the "SCB/1000 total C" as a function of "IR5 Area Ratio."

A series of "linear baseline-subtracted chromatographic heights" for the chromatogram generated by the "IR5 methyl channel sensor" was established as a function of column elution volume, to generate a baseline-corrected chromatogram (methyl channel). A series of "linear baseline-subtracted chromatographic heights" for the chromatogram generated by the "IR5 measurement channel" was established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" was calculated at each column elution volume index (each equally-spaced index, representing 1 data point per second at 1 ml/min elution) across the sample integration bounds. The "IR5 Height Ratio" was multiplied by the coefficient $A_1$, and the coefficient $A_0$ was added to this result, to produce the predicted SCB frequency of the sample. The result was converted into mole percent comonomer, as follows in Equation 5B:

Mole Percent Comonomer (Eqn. 5B)={$SCB_f$/[$SCB_f$+ (1000−$SCB_f$*Length of comonomer)/2)]}*100     (Eqn. 5B), where "$SCB_f$" is the "SCB per 1000 total C" and the "Length of comonomer"=8 for octene, 6 for hexene, and so forth.

Each elution volume index was converted to a molecular weight value ($Mw_i$) using the method of Williams and Ward (described above; Eqn. 1B). The "Mole Percent Comonomer (y axis)" was plotted as a function of Log($Mw_i$), and the slope was calculated between $Mw_i$ of 15,000 and $Mw_i$ of 150,000 g/mole (end group corrections on chain ends were omitted for this calculation). An EXCEL linear regression was used to calculate the slope between, and including, $Mw_i$ from 15,000 to 150,000 g/mole. This slope is defined as the molecular weighted comonomer distribution index (MWCDI=Molecular Weighted Comonomer Distribution Index).

Representative Determination of MWCDI

To illustrate determination of MWCDI, a representative determination of MWCDI is provided for a sample composition. A plot of the measured "SCB per 1000 total C (=$SCB_f$)" versus the observed "IR5 Area Ratio" of the SCB standards was generated (see FIG. 1), and the intercept ($A_0$) and slope ($A_1$) were determined. Here, $A_0$=−90.246 SCB/1000 total C; and $A_1$=499.32 SCB/1000 total C.

The "IR5 Height Ratio" was determined for the sample composition. This height ratio (IR5 Height Ratio of sample composition) was multiplied by the coefficient $A_1$, and the coefficient $A_0$ was added to this result, to produce the predicted SCB frequency of this example, at each elution volume index, as described above ($A_0$=−90.246 SCB/1000 total C; and $A_1$=499.32 SCB/1000 total C). The $SCB_f$ was plotted as a function of polyethylene-equivalent molecular weight, as determined using Equation 1B, as discussed above.

The $SCB_f$ was converted into "Mole Percent Comonomer" via Equation 5B. The "Mole Percent Comonomer" was plotted as a function of polyethylene-equivalent molecular weight, as determined using Equation 1B, as discussed above. A linear fit was from Mwi of 15,000 g/mole to Mwi of 150,000 g/mole, yielding a slope of "2.27 mole percent comonomer×mole/g." Thus, the MWCDI=2.27. An EXCEL linear regression was used to calculate the slope between, and including, Mwi from 15,000 to 150,000 g/mole.

Seal strength refers to the force required to pull a heat seal apart and is expressed as the peak load newtons, (N/25.4 mm) at specified seal temperatures. The seal strength is measured according to ASTM F-88, using, in general specimens with 25.4 mm width.

Zero-Shear Viscosity Ratio (ZSVR) is defined as the ratio of the zero-shear viscosity (ZSV) of the branched polyethylene material to the ZSV of a linear polyethylene material (see ANTEC proceeding below) at the equivalent weight average molecular weight (Mw(conv gpc)), according to the following Equation 5:

$$ZSVR = \frac{\eta_{0B}}{\eta_{0L}} = \frac{\eta_{0B}}{2.29^{-15} M_{w(conv \cdot gpc)}^{3.65}}. \quad \text{(Eqn. 5)}$$

The ZSV value was obtained from creep test, at 190° C., via the method described above. The Mw(conv gpc) value was determined by the conventional GPC method (Equation 3), as discussed above. The correlation between ZSV of linear polyethylene and its Mw(conv gpc) was established based on a series of linear polyethylene reference materials. A description for the ZSV-Mw relationship can be found in the ANTEC proceeding: Karjala et al., *Detection of Low Levels of Long-chain Branching in Polyolefins*, Annual Technical Conference—Society of Plastics Engineers (2008), 66th 887-891.

DETAILED DESCRIPTION

The present disclosure provides a flexible multilayer film. The flexible multilayer film has at least three layers. The flexible multilayer film includes a seal layer and a backing layer. The seal layer includes an ionomer. The backing layer is in direct contact with the seal layer. The backing layer includes an ethylene/α-olefin multi-block copolymer.

1. Flexible Multilayer Film

The flexible multilayer film is resilient, flexible, deformable, and pliable. The flexible multilayer film may be (i) a coextruded multilayer structure, (ii) a laminate, or (iii) a combination of (i) and (ii). The flexible multilayer film includes at least three layers. The flexible multilayer has at least three, or four, or five, or six, or seven, or eight, or nine, or ten, or eleven or more layers. The flexible multilayer film has a seal layer, and a backing layer.

The flexible multilayer film includes a seal layer. The seal layer includes an ionomer. An "ionomer," as used herein, is an ion-containing polymer. An "ion" is an atom that has an electrical charge, either positive or negative. The ionomer has a majority weight percent (generally 85% to 90%) of repeating monomer units that are non-ionic (non-polar), and a minority weight percent (generally 10% to 15%) of repeating comonomer units that are ionic, or polar (i.e., positively-charged or negatively-charged). The positive charges of the ionic groups attract the negative charges of the ionic groups, creating ionic bonds. Ionomer resins exhibit what is known as "reversible crosslinking" behavior, i.e. when an ionomer is heated, the polymer chains have increased mobility, and the ionic bonds cannot stay intact because the positive charges and negative charges are pulled away from each other.

Non-limiting examples of the monomers and comonomers from which an ionomer is derived include a copolymer of at least one alphα-olefin and at least one ethylenically unsaturated carboxylic acid and/or anhydride. Non-limiting examples of suitable alpha-olefins include ethylene, propylene, 1-butene, 1-pentene, 1-hexene, 1-heptene, 1-octene, and 3-methylbutene. Non-limiting examples of suitable carboxylic acids and anhydrides include acrylic acid, methacrylic acid, ethacrylic acid, maleic acid, fumaric acid, and maleic anhydride.

In an embodiment, the ionomer is a copolymer of ethylene and methacrylic acid.

In an embodiment, the ionomer is a copolymer of ethylene and acrylic acid.

In an embodiment, the ionomer is a metal ionomer. A "metal ionomer," as used herein, refers to a copolymer based on a metal salt of a copolymer of an alphα-olefin and an ethylenically unsaturated carboxylic acid and/or anhydride. The metal ionomer may be fully or partially neutralized by a metal ion. Non-limiting examples of metals suitable for neutralizing an ionomer include the alkali metals, i.e., cations such as sodium, lithium, and potassium; alkaline earth metals, i.e., cations such as calcium, magnesium; and transition metals such as zinc.

In an embodiment, the metal ionomer has a density from 0.93 to 0.96 g/cc, a $T_m$ from 85° C. to 105° C., and a MI from 0.5 to 6.0 g/10 min.

In an embodiment, the ionomer is a sodium ionomer. The term "sodium ionomer," (or "NaI/O") as used herein, refers to a copolymer based on a sodium salt of a copolymer of ethylene and a vinyl comonomer with carboxylic acid/or anhydride. Non-limiting examples of suitable comonomer having vinyl comonomer with an acid group include methyl/methacrylic acid, vinyl acrylic acid, methacrylate, n-butyl acrylic acid, and acrylic acid.

In an embodiment, the metal ionomer is a zinc ionomer. The term "zinc ionomer," (or "ZnI/O") as used herein, refers to a copolymer based on a zinc salt of a copolymer of ethylene and a vinyl comonomer with carboxylic acid/or anhydride. Non-limiting examples of suitable comonomer having vinyl comonomer with an acid group include methyl/methacrylic acid, vinyl acrylic acid, methacrylate, n-butyl acrylic acid, and acrylic acid.

Non-limiting examples of suitable zinc ionomer include zinc salt of ethylene/acrylic acid comonomer, zinc salt of ethylene/methyl-methacrylic acid copolymer, zinc salt of ethylene/vinyl acrylic acid copolymer, zinc salt of ethylene/methacrylate copolymer, zinc salt of ethylene/n-butyl acrylic acid copolymer, and any combination thereof.

In an embodiment, the ionomer is a zinc salt of an ethylene and methacrylic acid ("MAA") copolymer having one, some, or all of the following properties:
  (i) a density from 0.93 g/cc to 0.96 g/cc; and/or
  (ii) a Tm from 95° C. to 99° C.; and/or
  (iii) a MI from 01.0 g/10 min to 2.0 g/10 min; and/or
  (iv) a % MAA from 5% to 20%, based on the total weight of the zinc ionomer.

Non-limiting examples of a suitable zinc ionomer include Surlyn® 1650, which is a zinc salt of an ethylene and methacrylic acid copolymer, available from Dow-DuPont.

The seal layer may have a thickness from 1 μm to 40 μm, or from 2 μm to 38 μm, or from 3 μm to 26 μm, or from 3 μm to 24 μm, or from 5 μm to 22 μm, or from 6 μm to 20 μm, or from 7 μm to 12 μm, or from 8 μm to 14 μm, or from 8 μm to 15 μm, or from 9 μm to 16 μm, or from 8 μm to 18 μm, or from 10 μm to 15 μm, or from 10 μm to 20 μm, or from 10 μm to 30 μm.

In an embodiment, the seal layer has a thickness from 1 μm to 20 μm.

In an embodiment, the seal layer has a thickness from 8 μm to 18 μm, or from 10 μm to 15 μm.

The flexible multilayer film includes a backing layer that is in direct contact with the seal layer. The backing layer is composed of an ethylene-α-olefin multi-block copolymer. In an embodiment, the backing layer is composed of a single polymeric material, namely, an ethylene-α-olefin multi-block copolymer.

The ethylene/α-olefin multi-block copolymer is an ethylene/α-olefin multi-block copolymer. The term "ethylene/α-olefin multi-block copolymer" refers to an ethylene/$C_4$-$C_8$ α-olefin multi-block copolymer consisting of ethylene and one copolymerizable $C_4$-$C_8$ α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The $C_4$-$C_8$ α-olefin is selected from butene, hexene, and octene. The ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Ethylene comprises the majority mole fraction of the whole ethylene/α-olefin multi-block copolymer, i.e., ethylene comprises at least 50 wt % of the whole ethylene/α-olefin multi-block copolymer. More preferably, ethylene comprises at least 60 wt %, at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains from 50 wt % to 90 wt % ethylene, or from 60 wt % to 85 wt % ethylene, or from 65 wt % to 80 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, greater than 10 wt %, or greater than 15 wt %, based on the weight of the polymer. In an embodiment, the comonomer content in the soft segments is greater than 20 wt %, greater than 25 wt %, greater than 30 wt %, greater than 35 wt %, greater than 40 wt %, greater than 45 wt %, greater than 50 wt %, or greater than 60 wt % and can be up to 100 wt %.

The soft segments can be present in an ethylene/α-olefin multi-block copolymer from 1 wt % to 99 wt % of the total weight of the ethylene/α-olefin multi-block copolymer, or from 5 wt % to 95 wt %, from 10 wt % to 90 wt %, from 15 wt % to 85 wt %, from 20 wt % to 80 wt %, from 25 wt % to 75 wt %, from 30 wt % to 70 wt %, from 35 wt % to 65 wt %, from 40 wt % to 60 wt %, or from 45 wt % to 55 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-Polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, ethylene/α-olefin multi-block copolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$Tm > -2002.9 + 4538.5(d) - 2422.2(d)^2$, and/or (B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:
ΔT>−0.1299 ΔH+62.81 for ΔH greater than zero and up to 130 J/g
ΔT≥48° C. for ΔH greater than 130 J/g
wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of cross-linked phase:

$Re > 1481 - 1629(d)$; and/or (D) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range from 1:1 to 9:1.

The ethylene/α-olefin multi-block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3.

It is understood that the ethylene/α-olefin multi-block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, col. 31 line 26 through col. 35 line 44, which is herein incorporated by reference for that purpose.

In an embodiment, the ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2,$$

where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 125° C., or 130° C., or 135° C.

In an embodiment, the ethylene/α-olefin multi-block copolymer is an ethylene/1-octene multi-block copolymer (consisting only of ethylene and octene comonomer) and has one, some, or all of the following properties:
  (i) a Mw/Mn from 1.7, or 1.8 to 2.2, or 2.5, or 3.5; and/or
  (ii) a density from 0.860 g/cc, or 0.865 g/cc, or 0.870 g/cc, or 0.877 g/cc, or 0.880 g/cc; and/or
  (iii) a melting point, Tm, from 115° C., or 118° C., or 119° C., or 120° C. to 120° C., or 123° C., or 125° C.; and/or
  (iv) a melt index (MI) from 0.1 g/10 min, or 0.5 g/10 min to 1.0 g/10 min, or 2.0 g/10 min, or 5 g/10 min, or 10 g/10 min; and/or
  (v) 50-85 wt % soft segment and 40-15 wt % hard segment; and/or
  (vi) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or
  (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or
  (viii) an elastic recovery (Re) from 50%, or 60% to 70%, or 80%, or 90%, at 300% 300% $min^1$ deformation rate at 21° C. as measured in accordance with ASTM D 1708; and/or
  (ix) a polydisperse distribution of blocks and a polydisperse distribution of block sizes.

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Michigan, USA.

The ethylene/α-olefin multi-block copolymers can be produced via a chain shuttling process such as described in U.S. Pat. No. 7,858,706, which is herein incorporated by reference. In particular, suitable chain shuttling agents and related information are listed in col. 16 line 39 through col. 19 line 44. Suitable catalysts are described in col. 19 line 45 through col. 46 line 19 and suitable co-catalysts in col. 46 line 20 through col. 51 line 28. The process is described throughout the document, but particularly in col. 51 line 29 through col. 54 line 56. The process is also described, for example, in the following: U.S. Pat. Nos. 7,608,668; 7,893,166; and 7,947,793.

The ethylene/α-olefin multi-block copolymer may comprise two or more embodiments disclosed herein.

In an embodiment, the backing layer has a thickness from 1 μm to 30 μm, or from 5 μm to 25 μm.

In an embodiment, the backing layer has a thickness from 1 μm to 30 μm, or from 5 μm to 25 μm, or from 1 μm to 20 μm, or from 2 μm to 18 μm, or from 3 μm to 16 μm, or from 3 μm to 14 μm, or from 5 μm to 12 μm, or from 6 μm to 10 μm, or from 7 μm to 12 μm, or from 8 μm to 14 μm, or from 9 μm to 16 μm, or from 10 μm to 15 μm, or from 12 μm to 20 μm, or from 14 μm to 25 μm.

In an embodiment, the backing layer has a thickness from 10 μm to 25 μm, or from 14 μm to 25 μm.

The flexible multilayer film includes a tie layer. The tie layer is in direct contact with a backing layer. The flexible multilayer film may include more than one tie layer.

The tie layer may be composed of one or more polymeric materials. Nonlimiting examples of suitable polymeric materials for tie layer include functionalized ethylene-based polymers such as ethylene-vinyl acetate (EVA) copolymer; polymers with maleic anhydride-grafted to polyolefins such as any polyethylene, ethylene-copolymers, or polypropylene; ethylene acrylate copolymers such an ethylene methyl acrylate (EMA); glycidyl containing ethylene copolymers; propylene and ethylene based olefin block copolymers such as INFUSE™ (ethylene-based Olefin Block Copolymers available from the Dow Chemical Company) and INTUNE™ (PP-based Olefin Block Copolymers available from The Dow Chemical Company); and low density polyethylene (LDPE) resins such Dowlex™ GM 8070 (polyethylene resin available from the Dow Chemical Company) and LDPE 132i (low density polyethylene resin available from the Dow Chemical Company); anhydride-modified, linear low-density polyethylene (LLDPE) such as BYNEL™ 41E70 (linear low density polyethylene resin available from Dow Chemical Company and blends thereof.

The tie layer has a thickness from 1 μm to 20 μm, or from 2 μm to 18 μm, or from 3 μm to 16 μm, or from 3 μm to 14 μm, or from 5 μm to 12 μm, or from 6 μm to 10 μm.

In an embodiment, the tie layer has a thickness from 5 μm to 12 μm.

In an embodiment, the flexible multilayer film includes a barrier layer. The barrier layer is in direct contact with the tie layer. The flexible multilayer film includes one barrier layer or more than one barrier layer.

Nonlimiting examples of suitable materials for the barrier layer include one or more polyamides (nylons), ethylene vinyl alcohol copolymers (EVOH), polyvinylidene chloride, polyamide, or combination of two or more thereof and can include a scavenger materials and compounds of heavy metals like cobalt with MXD6 nylon.

The barrier layer has a thickness from 1 μm to 20 μm, or from 2 μm to 18 μm, or from 3 μm to 16 μm, or from 3 μm to 14 μm, or from 5 μm to 12 μm, or from 6 μm to 10 μm, or from 7 μm to 12 μm, or from 8 μm to 14 μm, or from 9 μm to 16 μm, or from 10 μm to 18 μm, or from 10 μm to 20 μm, or from 10 μm to 25 μm.

In an embodiment, the barrier layer has a thickness of from 8 μm to 14 μm.

The flexible multilayer film includes an outer layer which is the furthest layer from the seal layer. In an embodiment, the flexible multilayer film may include one or more inner layers disposed between the seal layer and the outer layer. The outer layer may be composed of one or more polymeric materials. Nonlimiting examples of suitable polymeric material for the outer layer include those used to make biaxially or monoaxially oriented films for lamination as well as coextruded films. Nonlimiting polymeric material for the outer layer include biaxially oriented polyethylene terephthalate (OPET), monoaxially oriented nylon (MON), biaxially oriented nylon (BON), biaxially oriented polypropylene (BOPP), and biaxially or monoaxially oriented polyethylene (BOPE and MDO PE). Other polymeric materials useful in constructing film layers for structural benefit are polypropylenes (such as propylene homopolymer, random propylene copolymer, propylene impact copolymer, thermoplastic polypropylene (TPO) and the like, propylene-based plastomers (e.g., VER-SIFY™ or VISTAMAX™)), polyamides (such as Nylon 6; Nylon 6,6; Nylon 6,66; Nylon 6,12; Nylon 12; etc.), polyethylene norbornene, cyclic olefin copolymers, polyacrylonitrile, polyesters, copolyesters (such as polyethylene terephthlate (PET)), cellulose esters, polyethylene and copolymers of ethylene (e.g., LLDPE based on ethylene octene copolymer such as DOWLEX™), blends thereof, and multilayer combinations thereof.

The outer layer has a thickness from 1 µm to 20 µm, from 2 µm to 18 µm, from 3 µm to 16 µm, from 4 to 14 µm, from 5 µm to 12 µm, from 6 µm to 10 µm, from 7 µm to 11 µm, from 8 µm to 12 µm, from 9 µm to 12 µm, 10 µm to 13 µm, and from 11 µm to 14 µm; and from 12 µm to 15 µm.

In an embodiment, the outer layer thickness is from 12 µm to 15 µm.

The flexible multilayer film may include additional layers which may contribute to the structural integrity or provide specific properties. The additional layers may be added by direct means (coextrusion, for example) or by using appropriate tie layers to the adjacent polymer layers. Polymers which may provide additional performance benefits such as stiffness, toughness or opacity, as well polymers which may offer gas barrier properties or chemical resistance can be added to the structure.

The present flexible multilayer film has 3, or 4, or 5, of 6, or 7, or 8, or 9, or 10, or 11, or more layers. Nonlimiting examples of layer structures for the present multilayer flexible film are provided below wherein "/" represents layer interface:

seal/backing/tie/barrier/tie/outer, seal/backing/tie/barrier/tie/barrier/tie/outer, seal/backing/tie/barrier/barrier/tie/outer, seal/backing/tie/barrier/tie/barrier/barrier/tie/outer, and seal/backing/tie/barrier/tie/inner/outer The present disclosure provides another flexible multilayer film. In an embodiment, the flexible multilayer film has at least three layers. The flexible multilayer film includes a seal layer and a backing layer. The seal layer includes an ionomer. The backing layer is in direct contact with the seal layer. The backing layer includes a first ethylene composition which comprises at least one ethylene-based polymer, having (i) a molecular weighted comonomer distribution index ("MWCDI") value greater than 1.2 and (ii) a melt index ratio (I10/I2) that meets the following equation: I10/I2≥7.0−1.2×log (I2) (hereafter referred to as "first composition 1").

The flexible multilayer film has the layer structure/composition of any flexible multilayer film previously disclosed herein and includes first composition 1 in the backing layer, alone, or in combination with, the ethylene/α-olefin multi-block copolymer.

First composition 1 contains two-ethylene-octene copolymers. First composition 1 is prepared, via solution polymerization, in a dual series loop reactor system according to International Patent Publication No. WO2019/005930, filed on 27 Jun. 2018, the entire content of which is incorporated by reference herein.

In an embodiment, first composition 1 includes one, some, or all of the following properties:

(i) a density from 0.910 g/cc to 0.920 g/cc; and/or (ii) $I_2$ from 0.5 g/10 min to 1.0 g/10 min; and/or (iii) $I_{10}/I_2$ from 8.0 to 8.5; and/or (iv) MWCDI from 2.5 to 3.0.

In an embodiment, first composition 1 has the properties in Table A below.

TABLE A

Properties of First Composition 1

| Properties | Unit | First Composition 1 |
|---|---|---|
| Density | g/cc | 0.9117 |
| $I_2$ | g/10 min | 0.86 |
| $I_{10}/I_2$ | | 8.14 |
| 7.0 − 1.2 × log(I2) | | 7.08 |
| Mn (conv. gpc) | g/mol | 30,406 |
| Mw (conv. gpc) | | 115,271 |
| Mz (conv. gpc) | | 273,416 |
| Mw/Mn (conv. gpc) | | 3.79 |
| Mz/Mw (conv. gpc) | | 2.37 |
| Eta* (0.1 rad/s) | Pa · s | 11,139 |
| Eta* (1.0 rad/s) | Pa · s | 8,215 |
| Eta* (10 rad/s) | Pa · s | 4,704 |
| Eta* (100 rad/s) | Pa · s | 1,715 |
| Eta*0.1/Eta*100 | | 6.5 |
| Eta zero | Pa · s | 13568 |
| MWCDI | | 2.86 |
| Vinyls | Per 1000 total Carbons | Not Measured |
| ZSVR | | 2.0 |

In an embodiment, the flexible multilayer film includes a seal layer composed of a metal ionomer and a backing layer in direct contact with the seal layer, the backing layer composed of first composition 1. The flexible multilayer film includes a tie layer in direct contact with the backing layer. The tie layer can be any tie layer as previously disclosed herein. The flexible multilayer film includes a barrier layer in direct contact with the tie layer. The barrier layer can be any barrier layer as previously disclosed herein. The seal layer, backing layer, tie layer, and barrier layer have the same respective thickness as previously disclosed herein for the flexible multilayer film having backing layer composed of an ethylene/α-olefin multi-block copolymer.

In an embodiment, the backing layer is composed of a sole polymer material, namely first composition 1.

2. Flexible Pouch

The present disclosure provides a flexible pouch. In an embodiment, the flexible pouch includes opposing flexible multilayer films superimposed on one another so as to define a common peripheral edge. Each flexible multilayer film has at least three layers. Each flexible multilayer film includes a seal layer and a backing layer. The seal layer includes an ionomer. The backing layer is in direct contact with the seal layer. The backing layer includes an ethylene/α-olefin multi-block copolymer and/or first composition 1. The flexible pouch includes a peripheral seal extending along at least a portion of the common peripheral edge. The peripheral seal forms a closed flexible pouch having a storage compartment.

Each flexible multilayer film is any flexible multilayer flexible film as previously disclosed herein (i.e., multilayer film having at least three layers with ionomer seal layer and ethylene/α-olefin multi-block copolymer and/or first composition 1 backing layer). The structure and composition of each flexible multilayer film may be the same or may be different. The opposing flexible multilayer films may be two discrete, or two individual films, superimposed on each other. Alternatively, the opposing flexible multilayer films are two different portions of the same film, or single film, wherein the single film is folded so that portions of the single film oppose each other so that the seal layers oppose each other.

The opposing flexible multilayer films are superimposed on each other and form the common peripheral edge. The common peripheral edge defines a perimeter shape for the flexible pouch. The perimeter shape for the flexible pouch can be a polygon (such as triangle, square, rectangle, diamond, pentagon, hexagon, heptagon, octagon, etc.) or an ellipse (such as an ovoid, an oval, or a circle).

A peripheral seal extends along at least a portion of the common peripheral edge to form a storage compartment within the flexible pouch. In an embodiment, the peripheral seal extends along the entire common peripheral edge. The peripheral seal forms a storage compartment within the flexible pouch.

The peripheral seal seals, or otherwise adheres, flexible multilayer film to flexible multilayer film. The peripheral seal is formed by way of ultrasonic seal, heat seal, adhesive seal, and combinations thereof. The peripheral seal includes opposing seal layers (opposing ionomer layers) of each flexible multilayer film, in direct contact with each other.

In an embodiment, the peripheral seal is formed by way of a heat sealing procedure. The term "heat sealing," as used herein, is the act of placing two or more films of polymeric material between opposing heat seal bars, the heat seal bars moved toward each other, sandwiching the films, to apply heat and pressure to the films such that opposing interior surfaces (seal layers) of the films contact, melt, and form a heat seal, or a weld, to attach the films to each other. Heat sealing includes suitable structure and mechanism to move the seal bars toward and away from each other in order to perform the heat sealing procedure.

The peripheral seal has a seal strength from 9 N/25.4 mm to 25 N/25.4 mm, or from 12 N/25.4 mm to 20 N/25.4 mm.

The opposing seal layers can also be corona treated to improve wettability and adhesion to the comestible packaged inside.

In an embodiment, the flexible pouch includes a comestible in the storage compartment. The comestible is in direct contact with one, or both, of the opposing seal layers (ionomer). The comestible may be a solid substance and/or a liquid substance. Nonlimiting examples of suitable liquid comestibles include sauces, condiments (ketchup, mustard, mayonnaise), butter, and baby food. Nonlimiting examples of suitable solid comestibles include powders, grains, meat, granular solids, animal feed, and pet food, cooked ham, cured meats, etc.

Applicant discovered that the combination of (i) the backing layer composed of a single polymer (not a polymer blend) that is the ethylene/α-olefin multi-block copolymer (and/or first composition 1) (ii) in direct contact (iii) with the seal layer that is metal ionomer (and zinc ionomer in particular) unexpectedly results in an increased seal strength of the peripheral seal to prevent leaking or damage during the cooking process. The increase in seal strength advantageously enables the production of multilayer films with thinner backing layer (ethylene/α-olefin multi-block copolymer and/or first composition 1) and/or thinner seal layer (ionomer).

By way of example, and not limitation, some embodiments of the present disclosure will now be described in detail in the following Examples.

EXAMPLES

Materials used in the examples are provided in Table 2 below.

TABLE 2

| Material/Description | Properties | Source |
|---|---|---|
| INFUSE ™ 9000 | ethylene/octene multi-block copolymer<br>d = 0.877 g/cc; $T_m$ = 120° C.;<br>I2 = 0.5 g/10 min | The Dow Chemical Co. |
| INFUSE ™ 9130.05 | ethylene/octene multi-block copolymer<br>d = 0.888 g/cc; $T_m$ = 120° C.<br>I2 = 1.5 g/10 min | The Dow Chemical Co. |
| INFUSE ™ 9100 | ethylene/octene multi-block copolymer<br>d = 0.877 g/cc; $T_m$ = 121° C.<br>I2 = 0.5 g/10 min | The Dow Chemical Co. |
| first composition 1 | ethylene/octene copolymer<br>d = 0.9117 g/cc; $T_m$ = 123° C.<br>$I_2$ = 0.86 g/10 min<br>$I_{10}/I_2$ = 8.14<br>MWCDI = 2.86 | The Dow Chemical Co. |
| Versify ™ 2000 | Propylene-ethylene copolymer<br>d = 0.888 g/cc; $T_m$ =<br>I2 = 2 g/10 min | The Dow Chemical Co. |
| DOWLEX ™ GM 8070<br>(GM 8070) | Polyethylene resin<br>d = 0.917 g/cc; $T_m$ = 123° C.<br>I2 = 0.9 g/10 min | The Dow Chemical Co. |
| BYNEL ™ 41E687 | Anhydride-modified, linear low-density polyethylene (LLDPE) resin<br>d = 0.91 g/cc; $T_m$ = 119° C.<br>I2 = 1.7 g/10 min | The Dow Chemical Co. |
| SURLYN ™ 1650<br>(SUR 1650) | a zinc salt of ethylene and methacrylic acid copolymer<br>d = 0.94 g/cc; $T_m$ = 97° C.<br>I2 = 1.8 g/10 min | The Dow Chemical Co. |
| LDPE 132I<br>(132i) | Low density polyethylene resin<br>d = 0.921 g/cc; $T_m$ = 110° C.<br>I2 = 0.25 g/10 min | The Dow Chemical Co. |
| ATTANE ™ 4203 | Ultra low density polyethylene resin<br>d = 0.905 g/cc; $T_m$ = 123° C.<br>I2 = 0.8 g/10 min | The Dow Chemical Co. |
| PA | Polyamide - copolyamide 6/66 grade of high viscosity<br>d = 1.12 g/cc; Tm = 194° C.<br>Viscosity Measurement: 3.87 to 4.17<br>BASF - Ultramid C40 | |

TABLE 2-continued

| Material/Description | Properties | Source |
|---|---|---|
| EVOH | Ethylene vinyl alcohol - 38%<br>d = 1.17 g/cc; Tm = 173° C.<br>I2 = 4.0 g/10 min (210° C./2160 g)<br>NIPPON GOHSEI - Sarnol ET3803RB | |
| PP | Polypropylene-based polymer - homopolymer<br>d = 0.905 g/cc; Tm = 148° C.<br>I2 = 7.5 g/10 min<br>BRASKEM PP H401 | |
| Mor-free ™ 980 | Polyurethane adhesive<br>d = 1.14 g/cc | The Dow Chemical Co. |
| Elite ™ 5401G (5401) | Polyethylene resin<br>d = 0.918 g/cc; Tm = 123° C.<br>I2 = 18/10 min | The Dow Chemical Co. |

Example 1—Preparation of Film 1

A Dr. Colin blown film coextruder was used with a seven layer line and a die of 60 mm diameter to produce the seven layer film described in Table 3. The blown film coextruder has a blow-up ratio of 2.5. A PET outer layer is subsequently laminated to the seven layer top film. The top film is laminated to the PET outer layer via an adhesive layer. The PET outer layer is 12 microns thick. The adhesive layer is 3 microns thick and made of Morfree 980/CR 137.

The composition and structure of Film 1 (top film without PET laminate) are shown in Table 3 below.

TABLE 3

| | Comparative 1a | | Comparative 2b | | Inventive 1a | | Inventive 2a | |
|---|---|---|---|---|---|---|---|---|
| Layer | Layer Comp. | Thick. (µm) | Layer Comp. | Thick. (µm) | Layer Comp. | Thick. (µm) | Layer Comp. | Thick. (µm) |
| 1 | 20% 132i + 80% GM 8070 | 20 | 20% 132i + 80% GM 8070 | 20 | 20% 132i + 80% GM 8070 | 20 | 20% 132i + 80% GM 8070 | 20 |
| 2 | 20% 132i + 50% GM 8070 + 30% 5401 | 20 | Attane ™4203 | 20 | First composition 1 | 20 | Infuse 9130.05 | 20 |
| 3 | Tie layer | 5 | Tie layer | 5 | Tie layer | 5 | Tie layer | 5 |
| 4 (Barrier) | EVOH | 10 | EVOH | 10 | EVOH | 10 | EVOH | 10 |
| 5 (Tie) | Tie layer | 5 | Tie layer | 5 | Tie layer | 5 | Tie layer | 5 |
| 6 (Backing) | BYNEL 41E687 | 20 | Attane ™4203 | 20 | First composition 1 | 20 | Infuse 9130.05 | 20 |
| 7 (Seal) | SUR 1650 | 10 | SUR 1650 | 10 | SUR 1650 | 10 | SUR 1650 | 10 |

Example 2—Preparation of Film 2

A Dr. Colin blown film coextruder was used with a seven layer line and a die of 60 mm diameter, to produce the seven layer film shown in table 4. The blown film coextruder has a blow-up ratio of 2.5.

The composition and structure of Film 2 (bottom film) are shown in Table 4 below.

TABLE 4

| | Comparative 1b | | Comparative 2b | | Inventive 1b | | Inventive 2b | |
|---|---|---|---|---|---|---|---|---|
| Layer | Layer Comp. | Thick. (µm) | Layer Comp. | Thick. (µm) | Layer Comp. | Thick. (µm) | Layer Comp. | Thick. (µm) |
| 1 | PP | 40 | PP | 40 | PP | 40 | PP | 40 |
| 2 | 20% 132i + 50% GM 8070 + 30% 5401 | 15 | Attane ™ 4203 | 25 | First composition 1 | 25 | Infuse 9130.05 | 25 |
| 3 | Tie layer | 10 | tie layer | 10 | tie layer | 10 | tie layer | 10 |
| 4 (Barrier) | PA | 25 | PA | 25 | PA | 25 | PA | 25 |
| 5 (Tie) | tie layer | 10 | tie layer | 10 | tie layer | 10 | tie layer | 10 |
| 6 (Backing) | BYNEL 41E687 | 20 | Attane ™ 4203 | 25 | First composition 1 | 25 | Infuse 9130.05 | 25 |
| 7 (Seal) | SUR 1650 | 30 | SUR 1650 | 15 | SUR 1650 | 15 | SUR 1650 | 15 |

Example 3—Pouch Preparation

Pouches for cook in applications are made using a thermoforming packaging line and a HSG-C Brugger Sealer with flat seal bars of 150 mm×5 mm covered with a Teflon tape in order to prevent the multilayer flexible films from sticking on the bar. Flexible pouches are prepared with one top film (from Table 3) and one bottom film (from Table 4) placed in opposing relation to each other to define a common peripheral edge, the top film and bottom film mated in the following pairs:

Comparative 1a/comparative 1b—to form pouches Comp 2A and Comp 2B;
Comparative 2a/comparative 2b—to form pouches Comp 3A and Comp 3B;
Inventive 1a/inventive 1b—to form inventive pouches Inventive 2A and Inventive 2B; and
Inventive 2a/inventive 2b—to form inventive pouches Inventive 3A and inventive 3B.

Each flexible pouch is prepared by sealing the top film and the bottom film to each other so that the seal layers of each film are in direct contact with one another. The HSG-C Brugger Sealer (with flat seal bars of 150 mm—5 mm covered with a Teflon tape in order to prevent the film sticking on the bar) is used to form heat seals along the common peripheral edge of the top/bottom films. The pouches were tested over a range of heat sealing temperatures from 140° C. to 200° C., and heat sealing pressures 210 psi and 420 psi. Heat sealing dwell time is 0.5 seconds. Sealed films were cut into 25.4 mm width and pulled in a universal testing machine, following conditions described at ASTM F88. The results of the seal strength testing are shown in table 5, below.

TABLE 5

| Pressure 210 psi/dwell time 0.5 s | Comp -2A (N/25.4 mm) | Comp - 3A (N/25.4 mm) | Inventive - 2A (N/25.4 mm) | Inventive - 3A (N/25.4 mm) |
|---|---|---|---|---|
| 140° C. | 11.2 | 3.3 | 11.2 | 13.7 |
| 160° C. | 10.8 | 3.2 | 8.9 | 15.3 |
| 180° C. | 11.2 | 4.2 | 12.2 | 15.8 |
| 200° C. | 10.9 | 3.5 | 13.6 | 12.5 |

| Pressure 420 psi/dwell time 0.5 s | Comp - 2B (N/25.4 mm) | Comp - 3B (N/25.4 mm) | Inventive - 2B (N/25.4 mm) | Inventive - 3B (N/25.4 mm) |
|---|---|---|---|---|
| 140° C. | 9.1 | 3.2 | 14.0 | 17.2 |
| 160° C. | 10.5 | 2.0 | 15.1 | 19.1 |
| 180° C. | 10.2 | 2.6 | 13.6 | 17.1 |
| 200° C. | 10.0 | 2.4 | 14.6 | 14.6 |

Comparative flexible pouches, Comp 2A and Comp 2B, with thick seal layer in the bottom film (30 μm) show weaker seal strength at every heat seal condition when compared to inventive flexible pouches: Inventive 2A and Inventive 3B. Each inventive flexible pouch (Inventive 2A, 2B, 3A, 3B) has a thinner ionomer layer in the bottom film (15 μm) compared to 30 μm ionomer film layer for Comp 2A bottom film.

Inventive 2A/3A each exhibit stronger seal strength at every heat seal condition when compared to flexible pouch Comp 3A, having Attane™ 4203 as a backing layer.

Applicant discovered that a backing layer composed of a single polymeric material that is ethylene/α-olefin multi-block copolymer or first composition 1, in direct contact with a zinc ionomer seal layer surprisingly exhibits higher seal strength (12-20 N/25.4 mm) at the same, or thinner, ionomer seal layer thickness (10-15 μm) compared to films with thicker ionomer seal layer and/or conventional backing layer material.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A flexible multilayer film comprising:
   at least three layers
   a seal layer comprising an ionomer, the seal layer is a surface layer;
   a backing layer in direct contact with the seal layer, the backing layer comprising an ethylene/α-olefin multi-block copolymer consisting of (i) ethylene and (ii) a $C_4$-$C_8$ α-olefin comonomer.

2. The flexible multilayer film of claim 1 wherein the ionomer is a metal ionomer.

3. The flexible multilayer film of claim 1 wherein the seal layer has a thickness from 1 micron to 30 microns.

4. The flexible multilayer film of claim 1 wherein the ethylene/α-olefin multi-block copolymer consists of ethylene monomer and a $C_4$-$C_8$ α-olefin comonomer.

5. The flexible multilayer film of claim 1, wherein the backing layer has a thickness from 1 micron to 30 microns.

6. The flexible multilayer film of claim 1 comprising a tie layer in direct contact with the backing layer.

7. The flexible multilayer film of claim 6 comprising a barrier layer in direct contact with the tie layer.

8. The flexible multilayer film of claim 7 wherein the barrier layer comprises at least one member selected from the group consisting of ethylene/vinyl acetate copolymer, polyvinylidene chloride, and polyamide.

9. A flexible pouch comprising:
   opposing flexible multilayer films, the flexible multilayer films defining a common peripheral edge, each flexible multilayer film comprising;
   at least three layers
   a seal layer comprising an ionomer, the seal layer is a surface layer;
   a backing layer in direct contact with the seal layer, the backing layer comprising an ethylene/α-olefin multi-block copolymer consisting of (i) ethylene and (ii) a $C_4$-$C_8$ α-olefin comonomer; and a peripheral seal extending along at least a portion of the common peripheral edge, the peripheral seal forming a closed flexible pouch having a storage compartment.

10. The flexible pouch of claim 9 wherein the peripheral seal comprises opposing seal layers of each flexible multilayer film in direct contact with each other, the peripheral seal having a seal strength from 9 N/25.4 mm to 25 N/25.4 mm as measured in accordance with ASTM F 88.

11. The flexible pouch of claim 9 comprising
a comestible in the storage compartment, the comestible in direct contact with the opposing seal layers.

12. The flexible pouch of claim 9 wherein the ionomer is a metal ionomer.

13. The flexible pouch of claim 9 wherein the ethylene/α-olefin multi-block copolymer consists of ethylene monomer and a $C_4$-$C_8$ α-olefin comonomer.

14. The flexible pouch of claim 9 wherein the seal layer has a thickness from 8 microns to 15 microns.

15. The flexible pouch of claim 9, wherein the backing layer has a thickness from 1 micron to 30 microns.

* * * * *